United States Patent
Ton-That et al.

(10) Patent No.: US 8,572,309 B2
(45) Date of Patent: Oct. 29, 2013

(54) APPARATUS AND METHOD TO PROTECT METADATA AGAINST UNEXPECTED POWER DOWN

(75) Inventors: Luan Ton-That, San Jose, CA (US); Lau Nguyen, Sunnyvale, CA (US); Gwoyuh Hwu, Cupertino, CA (US)

(73) Assignee: Marvell World Trade Ltd., St. Michael (BM)

( * ) Notice: Subject to any disclaimer, the term of this patent is extended or adjusted under 35 U.S.C. 154(b) by 926 days.

(21) Appl. No.: 12/619,938

(22) Filed: Nov. 17, 2009

(65) Prior Publication Data

US 2010/0235565 A1    Sep. 16, 2010

Related U.S. Application Data

(60) Provisional application No. 61/159,775, filed on Mar. 12, 2009.

(51) Int. Cl.
*G06F 12/00* (2006.01)
*G06F 12/10* (2006.01)
*G06F 12/02* (2006.01)

(52) U.S. Cl.
USPC ............... 711/103; 711/206; 711/E12.001; 711/E12.008

(58) Field of Classification Search
None
See application file for complete search history.

(56) References Cited

U.S. PATENT DOCUMENTS

| 2007/0168698 A1* | 7/2007 | Coulson et al. ................... 714/5 |
| 2008/0126683 A1* | 5/2008 | Tsuji ............................. 711/103 |
| 2008/0228992 A1* | 9/2008 | Dumitru et al. ............... 711/100 |

* cited by examiner

*Primary Examiner* — Denise Tran

(57) ABSTRACT

A system includes first memory configured to store first metadata to associate logical addresses with physical addresses. Second memory is configured to include the physical addresses, to store first data based on the physical addresses, and to store portions of the first metadata when a status of a predetermined group of the physical addresses is changed. A recovery module is configured to update the first metadata based on the portions of the first metadata stored in the second memory.

12 Claims, 4 Drawing Sheets

APPARATUS AND METHOD TO PROTECT METADATA AGAINST UNEXPECTED POWER DOWN

CROSS-REFERENCE TO RELATED APPLICATIONS

This application claims the benefit of U.S. Provisional Application No. 61/159,775, filed on Mar. 12, 2009. The disclosure of the above application is incorporated herein by reference in its entirety.

FIELD

The present disclosure relates to protecting and rebuilding metadata.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A computing device may include various removable and non-removable storage devices that store data. The storage devices may include both volatile and non-volatile storage devices including, but not limited to, a hard disk drive (HDD), an optical storage drive, random access memory (RAM), read only memory (ROM), and removable memory. For example, the removable memory may include flash memory.

The flash memory may include a flash drive that is used to emulate an HDD. For example, the computing device may store data to the flash memory as if the flash memory is an HDD. The flash drive may store metadata that indicates how user data is stored to the flash drive. For example, the metadata may indicate how logical addresses correspond to actual physical addresses of the flash drive that contain the user data.

During operation of the computing device, the metadata is updated and stored in volatile memory when user data is read from and written to the flash drive. The metadata is transferred to the flash drive when the computing device is powered down.

SUMMARY

A system includes first memory configured to store first metadata to associate logical addresses with physical addresses. Second memory is configured to include the physical addresses, to store first data based on the physical addresses, and to store portions of the first metadata when a status of a predetermined group of the physical addresses is changed. A recovery module is configured to update the first metadata based on the portions of the first metadata stored in the second memory.

In other features, the first metadata includes a first lookup table to associate the logical address with the physical addresses. The first metadata includes a second lookup table to associate the physical addresses with the logical addresses. The predetermined group of the physical addresses is a wide erase block unit (WERU). The first metadata includes identifiers for a plurality of WERUs and the identifiers correspond to respective bins. The first metadata includes an activity log to indicate when a first identifier for one of the plurality of WERUs is changed. The second memory stores the portions of the first metadata when the first identifier is changed.

In other features, the portions of the first metadata include portions of the second lookup table associated with the one of the plurality of WERUs. The recovery module updates the first lookup table based on the portions of the second lookup table and the activity log. The recovery module retrieves the portions of the second lookup table and the activity log from the second memory when the system powers up.

A method includes storing first metadata in a first memory to associate logical addresses with physical addresses, storing first data based on the physical addresses in a second memory that includes the physical address, storing portions of the first metadata in the second memory when a status of a predetermined group of the physical addresses is changed, and updating the first metadata based on the portions of the first metadata stored in the second memory.

In other features, the method further includes associating the logical address with the physical addresses using a first lookup table included in the first metadata. The method further includes associating the physical addresses with the logical addresses using a second lookup table included in the first metadata. The predetermined group of the physical addresses is a wide erase block unit (WERU). The first metadata includes identifiers for a plurality of WERUs, and the identifiers correspond to respective bins. The method further includes indicating when a first identifier for one of the plurality of WERUs is changed using an activity log included in the first metadata.

In other features, the method further includes storing the portions of the first metadata in the second memory when the first identifier is changed. The portions of the first metadata include portions of the second lookup table associated with the one of the plurality of WERUs. The method further includes updating the first lookup table based on the portions of the second lookup table and the activity log. The method further includes retrieving the portions of the second lookup table and the activity log from the second memory when the system powers up.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
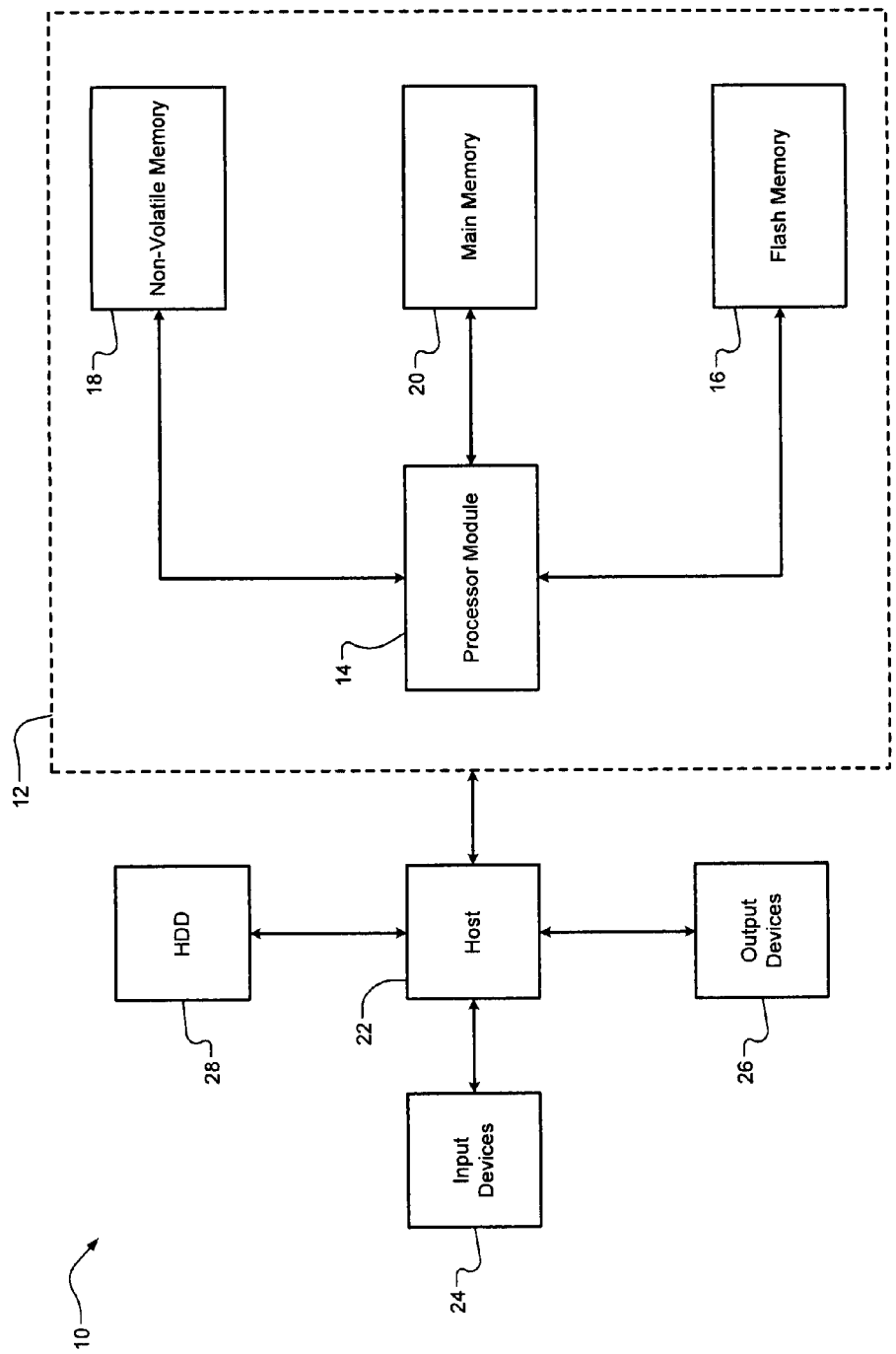
FIG. 1 is a functional block diagram of a computing device according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, a computing device 10 includes a flash memory module 12. The computing device 10 may include, but is not limited to, a computer, media player, mobile phone, personal digital assistant, or any other device that may include the flash memory module 12. The flash memory module 12 may be a removable memory module such as a memory card or a USB flash drive.

The flash memory module 12 includes a processor module 14, flash memory 16, non-volatile memory 18, and main memory 20. The processor module 14 executes instructions of software and firmware of the flash memory module 12. For example, the processor module 14 may execute instructions of firmware stored in the non-volatile memory 18. The processor module 14 may also read and execute instructions stored in the main memory 20. For example, the main memory 20 may include volatile memory such as random access memory (RAM).

The flash memory module 12 communicates with a host 22 of the computing device 10. The host 22 communicates with input devices 24 and output devices 26, and may communicate with secondary storage such as HDD 28. The input devices 24 include, but are not limited to, a keyboard or keypad, a mouse, a touch screen, a touch pad, a microphone, and/or other input devices. The output devices 26 include, but are not limited to, a display, a speaker, and/or other output devices.

The computing device 10 stores data in the flash memory module 12. The flash memory module 12 may emulate an HDD. For example, data is stored in the HDD 28 according to a logical block address (LBA), which corresponds to a physical block address (PBA) of the HDD 28. Typically, an HDD LBA is 512 bytes. In other words, the host 22 references the data in the HDD 28 according to the LBA, while the HDD 28 references the data according to the PBA.

Conversely, data is stored in the flash memory module 12 (i.e. in the flash memory 16) according to a logical allocation address (LAA), which corresponds to a physical allocation address (PAA) of the flash memory 16. For example only, the LAA is 4096 bytes. A flash allocation unit (AU) corresponds to a read or write unit of the flash memory 16 and may be equivalent to one LAA. A wide erase block unit (WERU) is an erase operation unit and corresponds to multiple (e.g. 2048) PAAs.

When the computing device 10 writes data to an LAA, the flash memory module 12 (e.g. firmware of the flash memory module 12) selects a corresponding PAA, which is referred to as "allocation." For example, the processor module 14 processes commands according to firmware stored in the non-volatile memory 18 to read and write data to the flash memory 16. The flash memory module 12 stores the data to the PAA of the flash memory 16 and stores metadata in the main memory 20 that indicates the relationship between the LAA and the corresponding PAA. For example, the metadata may include a lookup table (LUT) that associates LAAs with PAAs. The LUT associates each allocated LAA with a PAA. If a particular LAA is not allocated, the LAA may be associated with a recognizable invalid PAA value.

The metadata also includes WERU description data, including, but not limited to a PAA validity map, WERUs link information, and erase information. Each WERU includes an identifier that associates the WERU with a particular bin. For example, a WERU may be associated with a free bin, a valid bin, a partial bin, or a working bin. Free bins include WERUs whose PAAs are all ready to be written to. Valid bins include WERUs whose PAAS are all valid data. Partial bins include WERUs that include both PAAs with valid data and PAAs with invalid data (i.e. PAAs whose LAA data is subsequently written elsewhere). Working bins include WERUs that are currently being written to.

The metadata also includes data that corresponds to internal operations of the flash memory module 12, which includes, for example only, wear leveling, cleanup, and static management data.

When the computing device 10 reads from an LAA, the lookup table stored in the main memory 20 indicates which PAA to read the data from and the flash memory module retrieves the data accordingly. Conversely, when the computing device 10 writes to a previously written LAA, the flash memory module 12 allocates an unused PAA to the LAA. The data is stored in the new PAA and the LUT is updated accordingly. Thus, the metadata stored in the main memory 20 enables allocation and retrieval of data from the proper PAAs in the flash memory 16.

The metadata stored in the main memory 20 is updated as data is written to the flash memory module 12. Before the computing device 10 (and therefore the flash memory module 12) is powered down, the metadata is transferred from the main memory 20 to the flash memory 16. When the computing device 10 is powered up, the metadata is transferred from the flash memory 16 to the main memory 20 to establish proper associations between the LAAs and the PAAs. For example, the metadata may be transferred to the main memory 20 during a power up procedure of the computing device 10.

Any changes made to the metadata stored in the main memory 20 during operation of the computing device 10 after power up are not made to the flash memory module 12 until power down, or in response to internal metadata save commands that may be generated periodically by the firmware of the flash memory module 12. When power is lost unexpectedly during operation of the computing device 10, the changes made to the metadata stored in the main memory 20 may be lost. Accordingly, the metadata stored in the flash memory 16 is not updated (i.e. the metadata is old) and corresponds to a previous proper power down of the computing device 10. At a subsequent power up, the old metadata is transferred from the flash memory 16 to the main memory 20, leading to improper allocation and retrieval of the data in the flash memory 16.

Figure 2:
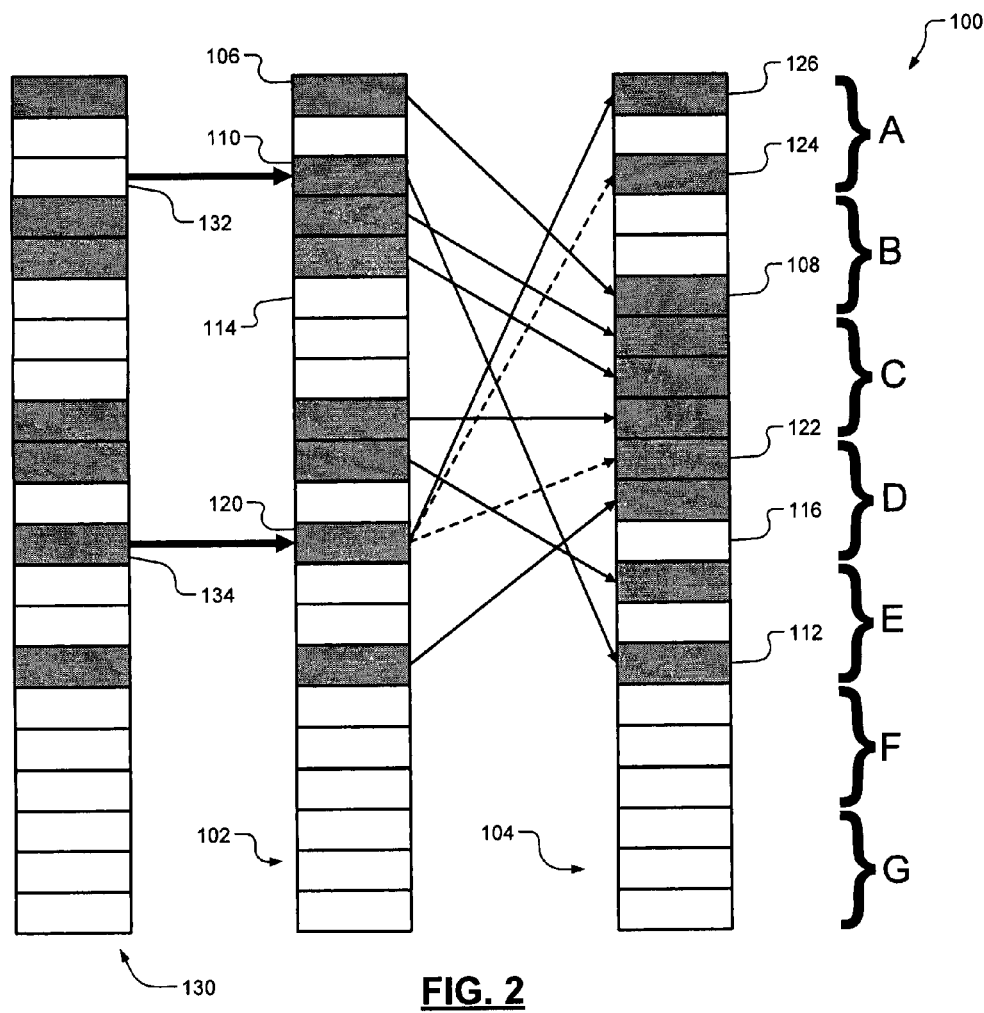
FIG. 2 illustrates a metadata lookup table according to the present disclosure.

Referring now to FIG. 2, a metadata LUT 100 stored in the main memory 20 associates LAAs 102 with PAAs 104 of the flash memory module 12. For example, when a read command requests data associated with LAA 106, the data is actually retrieved from a corresponding PAA 108. For example only, as shown in FIG. 2, solid blocks indicate the LAAs 102 that are associated with one of the PAAs 104 and empty blocks indicate the LAAs 102 that are not associated with one of the PAAs 104. Similarly, with respect to the PAAs 104, solid blocks indicate the PAAs 104 that store data and are allocated to one of the LAAs 102. Empty blocks indicate the PAAs 104 that do not contain data.

For example, LAA 106 corresponds to PAA 108. Accordingly, data requested from the LAA 106 will be retrieved from the PAA 108. Similarly, data requested from LAA 110 will be retrieved from PAA 112. Conversely, when data is to be written to an empty LAA 114, a PAA (e.g. PAA 116) that is empty or does not contain valid data is selected during allocation. Accordingly, the data written to the LAA 114 will actually be written to the PAA 116 or another one of the PAAs 104 in a working WERU.

For example only, each of WERUs A-G may include a group of three of the PAAs 104. For example, the WERUs A and E are working WERUs (i.e. WERUs that are currently being written to). The WERUs B and D are partial WERUs. The WERU C is a valid WERU. The WERUs F and G are free WERUs.

When data is written to an LAA 120 that already is associated with a PAA 122, a second PAA 124 is allocated to the LAA 120. When data is again written to the LAA 120, a third PAA 126 is allocated to the LAA 120. In other words, the PAAs 122 and 124 store old or stale data previously associated with the LAA 120 and the PAA 126 stores new data.

LUT 130 represents, the lookup table stored in the flash memory 16. The LUT 130 is transferred to the main memory 20 as the lookup table 102 during power up. Any changes made to the LUT 102 are not reflected in the LUT 130 stored in the flash memory 16. For example, the LUT 130 may not indicate subsequent changes made to LAAs 132 and 134.

As shown in FIG. 2, the metadata including the LUT 100 stored in the main memory 20 is updated as data is written to the PAAs 104 but is not updated in the flash memory 16. For example, the metadata stored in the flash memory 16 is indicative of a status of the LUT 100 at a most recent power up of the computing device 10. Accordingly, the metadata stored in the flash memory 16 may indicate that the LAA 120 is still associated with the PAA 122.

If the computing device 10 loses power unexpectedly, the metadata stored in the main memory 20 is lost. At the next power up, the metadata stored in the flash memory 16 is transferred to the main memory 20. Accordingly, requests to read data from one of the LAAs 102 that was written to before the loss of power will retrieve old data from one of the PAAS 104. For example, for a request to read data from the LAA 120, data will be retrieved from the PAA 122 instead of from the PAA 126.

Figure 3:
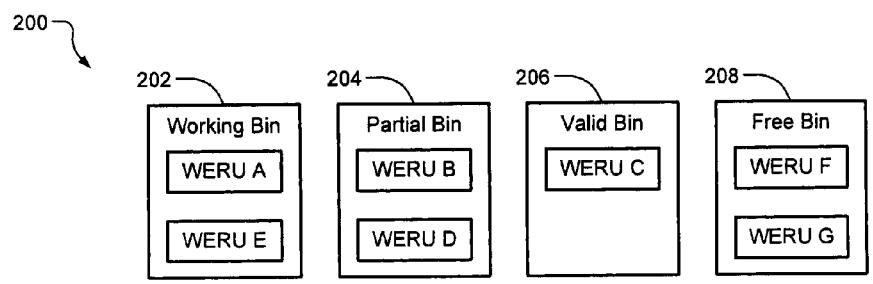
FIG. 3 is illustrates wide erase block unit (WERU) bins according to the present disclosure.

Referring now to FIG. 3, the metadata stored in the main memory 20 includes data that associates each WERU with a particular one of bins 200. For example, the WERUs A and E are associated with a working bin 202. The WERUs B and D are associated with a partial bin 204. The WERU C is associated with a valid bin 206. The WERUs F and G are associated with a free bin 208.

The metadata stored in the main memory 20 includes a WERU activity log (WAL). The WAL indicates when a particular WERU changes status. For example, the WAL indicates when a WERU moves from one of the bins 200 to another of the bins 200. For example, as data is written to the free WERU F, the free WERU F moves to the working bin 202, and then to the partial bin 204. When the WERU F is filled with valid data, the WERU F moves to the valid bin 206.

Figure 4:
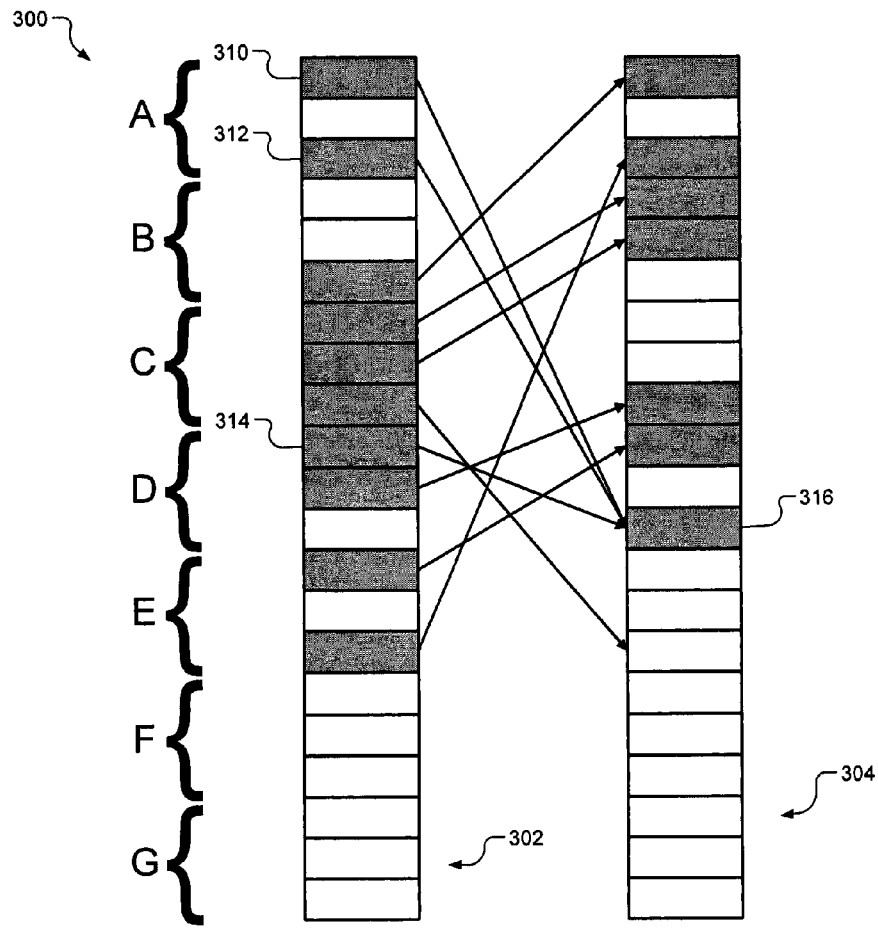
FIG. 4 illustrates a reverse lookup table according to the present disclosure.

Referring now to FIG. 4, the metadata stored in the main memory 20 includes a reverse lookup table (RLUT) 300. The RLUT 300 associates PAAs 302 of the flash memory with LAAs 304. A portion of the RLUT 300 is periodically stored in the flash memory 16. For example, when a particular WERU moves from the working bin 202 to the valid bin 206, a portion of the RLUT 300 corresponding to the WERU that moved to the working bin 202 is stored in the flash memory 16. The most recent (i.e. correct) associations between the PAAs 302 and the LAAs 304 (and the LAAs 102 and the PAAs 104 as shown in FIG. 2) can be recovered after an unexpected power loss using the LUT 100, the RLUT 300, and the WAL.

For example only, as shown in FIG. 4, solid blocks indicate PAAs 302 that store data and are allocated to one of the LAAs 304. Empty blocks indicate the PAAs 302 that do not contain data. With respect to the LAAs 304, solid blocks indicate the LAAs 304 that are associated with one of the PAAs 302 and empty blocks indicate the LAAs 304 that are not associated with one of the PAAs 302.

Figure 5:
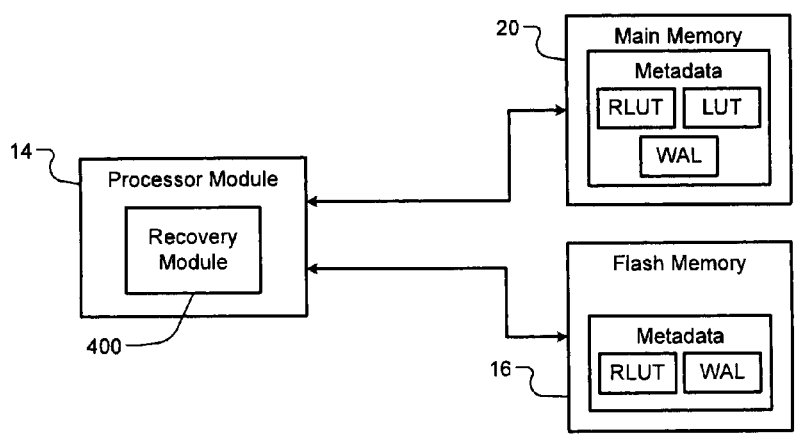
FIG. 5 is a functional block diagram of a processor module according to the present disclosure.

Referring now to FIG. 5, the processor module 14 includes a recovery module 400. For example only, the recovery module 400 may include or execute firmware stored in non-volatile memory 18. At power up, the computing device 10 transfers the metadata stored in the flash memory to the main memory 20 and the recovery module 400 determines whether to perform metadata recovery. For example, after a normal (i.e. scheduled or intentional) power down, the metadata may indicate that a user initiated a power down. If the metadata does not indicate that the user initiated a power down, the recovery module 400 may determine that an unexpected loss of power occurred and therefore perform the metadata recovery.

During metadata recovery, the recovery module 400 identifies WERUs that were written to and/or erased prior to the power loss based on the WAL. The WAL indicates when a particular WERU moves from one of the bins 200 to another of the bins 200. The WAL includes a time (e.g. a timestamp) for each WERU that indicates when the WERU was written to or erased. Therefore, the WAL indicates which of the WERUs were written to (i.e. moved to the working bin 202) and/or erased (i.e. moved to the free bin 208).

The recovery module 400 updates the metadata stored in the main memory 20 based on the WAL and the RLUT 300. For example, the recovery module 400 updates the WERU bins and the LUT 100. The recovery module 400 moves each of the WERUs to the proper bin. In other words, if the metadata indicates that a WERU is in the free bin 208 and the WAL indicates that the WERU was written to and is filled with valid data, the recovery module 400 moves the WERU to the valid bin 206. The recovery module 400 moves each WERU to an appropriate one of the bins 200 based on the WAL.

When the WERUs are in the proper bins, the recovery module 400 updates the LUT 100 based on the RLUT 300. Beginning with the WERUs having the most recent activity (i.e. the WERUs that were most recently written to and/or erased based on the timestamp), the recovery module 400 performs reverse allocation for each of the WERUs.

Referring again to FIG. 4, only portions of the RLUT 300 corresponding to WERUs that moved from one bin to another are stored to the flash memory 16. For example, no data was written to the WERUs F and G. Accordingly, the WERUs F and G remain associated with the free bin 208 and the portion of the RLUT 300 corresponding to the WERUs F and G are not written to the flash memory 16. During metadata recovery, the recovery module 400 does not need to update the portions of the LUT 100 that correspond to the WERUs F and G.

Conversely, the WERUs A and D moved, for example, from the free bin 208 to the partial bin 204 and the RLUT 300 stored in the flash memory 16 is updated accordingly. Therefore, the data in the LUT 100 stored in the main memory 20 may not reflect changes made to the WERUs A and D before the unexpected power loss. For example, each of PAAs 310, 312, and 314 may be associated with a single LAA 316.

During metadata recovery, the recovery module 400 identifies the WERUs A and D as WERUs that moved from one of the bins 200 to another based on the WAL. The recovery module 400 further determines that the most recent changes were made to the WERU A based on the WAL. Consequently, the recovery module 400 determines that the PAA 310 includes the newest data and is properly associated with the LAA 316 based on the WAL, the RLUT 300, and reverse allocation. The recovery module 400 updates the LUT 100 with the proper association for each WERU.

In some circumstances, the recovery module 400 may be unable to determine which of the LAAs 304 that one of the PAAs 302 is associated with. Each of the PAAs in the flash memory 16 includes data that indicates which LAA that the PAA is associated with. The recovery module 400 may read the data stored in the PAA to determine the proper LAA association.

The recovery module 400 also updates WERU description data including, but not limited to, a WERU validity map, link information, and erase information (e.g. a number of times each WERU is erased). The WERU description data may include an allocation map that indicates each time a PAA is read for WERUs in the working bin 202.

Figure 6:
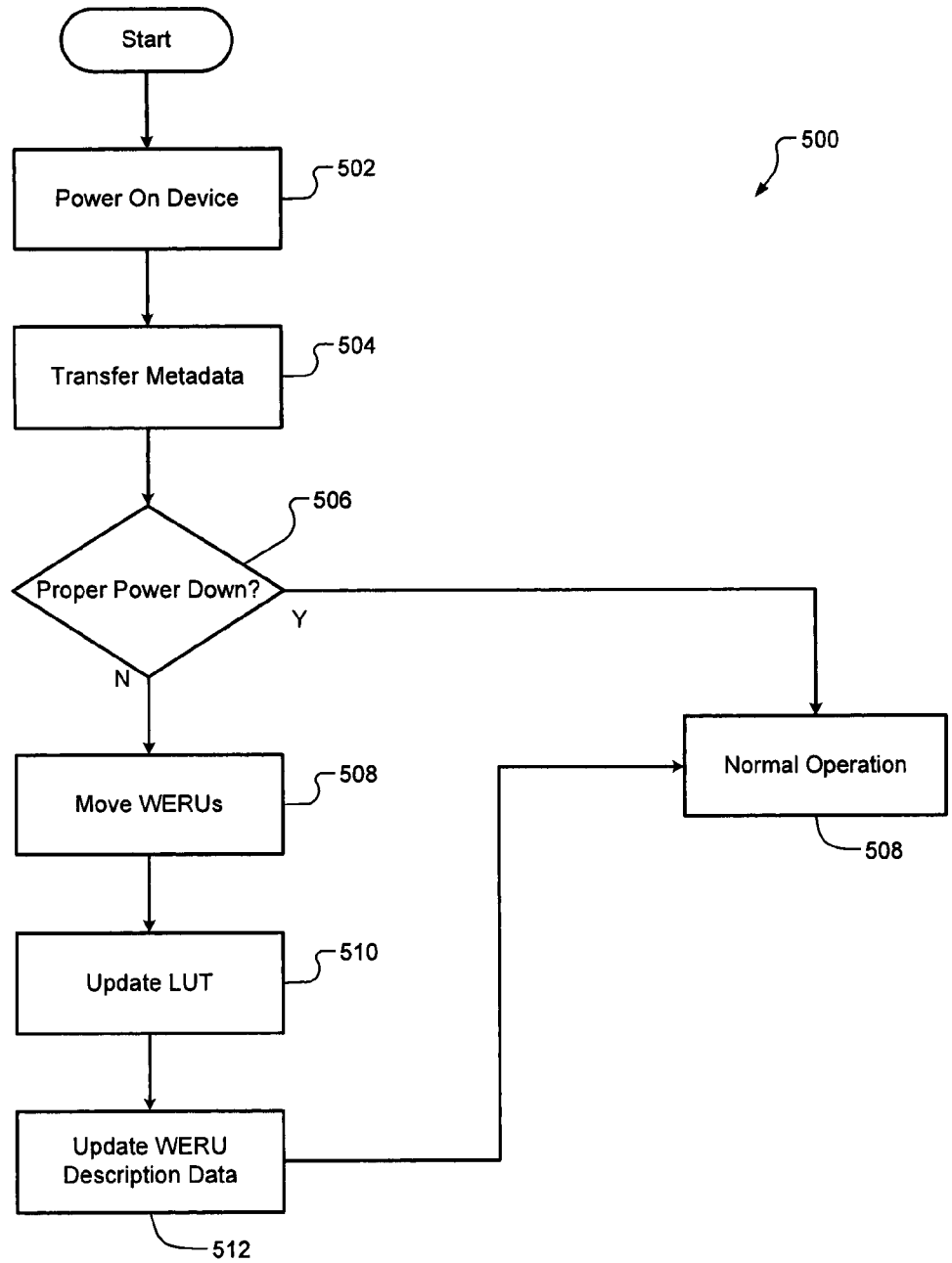
FIG. 6 is a flow diagram of a metadata recovery method according to the present disclosure.

Referring now to FIG. 6, a metadata recovery method 500 is shown. At 502, the computing device 10 is powered on. At 504, the recovery module 400 transfers the metadata from the flash memory 16 to the main memory 20. At 506, the recovery module 400 determines whether the computing device 10 was properly powered down. If true, the method 500 continues to 508. If false, the method 500 continues to 510. At 508 the computing device 10 proceeds to normal operation without performing metadata recovery.

At 510, the recovery module 400 moves each WERU to the proper bin based on the WAL. At 512, the recovery module 400 updates the LUT 100 based on the WAL and the RLUT 300. At 514, the recovery module 400 updates the LUT 100 based on LAA association data stored in any remaining PAAs. At 516, the recovery module 400 updates WERU description data and the computing device 10 proceeds to normal operation.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system, comprising:
    a first memory configured to store first metadata to associate logical addresses with physical addresses;
    a second memory having the physical addresses, wherein the second memory is configured to
        store first data based on the physical addresses of the second memory, and
        store portions of the first metadata i) in response to a status of a predetermined group of the physical addresses being changed, and ii) regardless of whether the system is being powered down; and
    a recovery module configured to, in response to a determination that the system was powered down improperly, update the first metadata stored in the first memory based on the portions of the first metadata stored in the second memory,
    wherein the first metadata includes a first lookup table to associate the logical addresses with the physical addresses of the second memory,
    wherein the first metadata includes a second lookup table to associate the physical addresses of the second memory with the logical addresses,
    wherein the predetermined group of the physical addresses is a wide erase block unit (WERU),
    wherein the first metadata includes identifiers for a plurality of WERUs, and wherein the identifiers correspond to respective bins, and
    wherein the first metadata includes an activity log to indicate when a first identifier for one of the plurality of WERUs is changed.

2. The system of claim 1, wherein the first memory includes volatile memory, and the second memory includes a flash memory module.

3. The system of claim 1, wherein the bins include a working bin, a partial bin, a valid bin, and a free bin.

4. The system of claim 1, wherein the second memory stores the portions of the first metadata when the first identifier is changed.

5. The system of claim 4, wherein the portions of the first metadata include portions of the second lookup table associated with the one of the plurality of WERUs.

6. The system of claim 5, wherein the recovery module updates the first lookup table based on (i) the portions of the second lookup table and (ii) the activity log.

7. The system of claim 6, wherein the recovery module retrieves the portions of the second lookup table and the activity log from the second memory when the system powers up.

8. A method for operating a device, the method comprising:
    storing, in a first memory, first metadata that associates logical addresses with physical addresses, wherein the physical addresses are associated with a second memory;
    storing, in the second memory, first data based on the physical addresses of the second memory;
    storing portions of the first metadata in the second memory i) in response to a status of a predetermined group of the physical addresses being changed, and ii) regardless of whether the device is powered down;
    in response to a determination that the device was powered down improperly, updating the first metadata stored in the first memory based on the portions of the first metadata stored in the second memory;
    associating the logical address with the physical addresses of the second memory based on a first lookup table included in the first metadata;
    associating the physical addresses of the second memory with the logical addresses based on a second lookup table included in the first metadata,
    wherein the predetermined group of the physical addresses is a wide erase block unit (WERU), and
    wherein the first metadata includes identifiers for a plurality of WERUs, and wherein the identifiers correspond to respective bins; and indicating when a first identifier for one of the plurality of WERUs is changed using an activity log included in the first metadata.

9. The method of claim 8, further comprising storing the portions of the first metadata in the second memory when the first identifier is changed.

10. The method of claim 9, wherein the portions of the first metadata include portions of the second lookup table associated with the one of the plurality of WERUs.

11. The method of claim 10, further comprising updating the first lookup table based on the portions of the second lookup table and the activity log.

12. The method of claim 11, further comprising retrieving the portions of the second lookup table and the activity log from the second memory when the device powers up.

* * * * *